(12) United States Patent
Posch et al.

(10) Patent No.: US 11,519,926 B2
(45) Date of Patent: Dec. 6, 2022

(54) MICROPLATE PROCESSING DEVICE

(71) Applicant: TECAN TRADING AG, Mannedorf (CH)

(72) Inventors: Johannes Posch, Salzburg (AT); Harald Gebethsroither, Salzburg (AT); Beat Bolli, Mannedorf (CH); Gerald Zerza, Salzburg (AT)

(73) Assignee: TECAN TRADING AG, Mannedorf (CH)

( * ) Notice: Subject to any disclaimer, the term of this patent is extended or adjusted under 35 U.S.C. 154(b) by 449 days.

(21) Appl. No.: 16/497,759

(22) PCT Filed: May 25, 2018

(86) PCT No.: PCT/EP2018/063761
§ 371 (c)(1),
(2) Date: Sep. 25, 2019

(87) PCT Pub. No.: WO2019/042599
PCT Pub. Date: Mar. 7, 2019

(65) Prior Publication Data
US 2021/0102965 A1 Apr. 8, 2021

(30) Foreign Application Priority Data
Aug. 31, 2017 (EP) .................................... 17188805

(51) Int. Cl.
*G01N 35/02* (2006.01)
*G01N 35/04* (2006.01)

(52) U.S. Cl.
CPC ... *G01N 35/028* (2013.01); *G01N 2035/0425* (2013.01)

(58) Field of Classification Search
None
See application file for complete search history.

(56) References Cited

U.S. PATENT DOCUMENTS 6,343,906 B1  2/2002  Kraemer et al.
7,360,984 B1  4/2008  Sugiyama et al.
(Continued)

FOREIGN PATENT DOCUMENTS

DE   202016102244 U1   5/2016
EP       0301583 A2    2/1989
(Continued)

OTHER PUBLICATIONS

International Preliminary Report on Patentability and Written Opinion for corresponding PCT/EP2018/063761, dated Mar. 12, 2020.
(Continued)

*Primary Examiner* — P. Kathryn Wright
(74) *Attorney, Agent, or Firm* — Notaro, Michalos & Zaccaria P.C.

(57) ABSTRACT

A microplate processing device having at least one carriage with a first receptacle for microplates where the at least one carriage is movable in a first horizontal direction, and having at least one lift that is movable in a vertical direction, where the microplates can be removed from and supplied to the carriage, the carriage has a through-opening, the periphery, in the vertical projection, can at least in part be situated horizontally within the periphery of a microplate held in the carriage, and the lift has a second receptacle for microplates, the periphery, in the vertical projection, is situated within the periphery of the through-opening, where the second receptacle can be moved unhindered through the through-opening in the vertical direction.

14 Claims, 6 Drawing Sheets

(56) References Cited

U.S. PATENT DOCUMENTS

| | | | | |
|---|---|---|---|---|
| 2002/0176803 A1* | 11/2002 | Hamel | ............... | G01N 35/1002 |
| | | | | 422/511 |
| 2007/0020152 A1* | 1/2007 | Costello, III | ........... | B01L 9/523 |
| | | | | 422/400 |
| 2014/0191109 A1 | 7/2014 | Chamberlin et al. | | |

FOREIGN PATENT DOCUMENTS

| | | | |
|---|---|---|---|
| JP | H07244052 | A | 9/1995 |
| JP | 2001188044 | A | 7/2001 |
| JP | 3260237 | B2 | 2/2002 |
| WO | 2006/017737 | A2 | 2/2006 |
| WO | 2006017737 | A2 | 2/2006 |

OTHER PUBLICATIONS

International Search Report for corresponding PCT application No. PCT/EP2018/063761, dated Aug. 22, 2018.

\* cited by examiner

MICROPLATE PROCESSING DEVICE

TECHNICAL FIELD

The present invention relates to a microplate processing device, in particular with a transfer unit for microplates.

PRIOR ART

Microplate processing devices in which microplates can be removed from or inserted into a carriage of the microplate processing device by way of a manipulator are known from the prior art. Such manipulators require space, particularly above the region of the extended carriage. In addition, such manipulators are complex, since they usually have to be movable in a number of directions. Furthermore, the accessibility of a gripper arranged on the manipulator is very limited in the region of the carriage. Consequently, access by the manipulator to a microplate arranged on the carriage is limited.

DESCRIPTION OF THE INVENTION

The object of the present invention is to provide a simple microplate processing device which requires little space and allows good accessibility to a microplate arranged thereon. Examples of microplate processing devices are patch clamp systems for electrophysiology, absorbance microplate readers, fluorescence microplate readers, luminescence microplate readers, cell imaging systems, electroporation for transfection, devices for performing fill-level measurements in microplates, and readers for microarrays in microplates.

This object is achieved by a microplate processing device having the features of claim 1. Further embodiments of the processing device, a processing system, and a method for introducing and/or discharging microplates into/from a processing region of a microplate processing device are defined by the features of further claims.

A microplate processing device according to the invention comprises at least one carriage with a first receptacle for microplates, wherein the at least one carriage is movable in a first horizontal direction, whereby the microplates can be introduced into a processing region of the processing device and can be discharged from the processing region. The processing device also comprises at least one lift, which is movable in a vertical direction, whereby the microplates can be removed from and supplied to the carriage. The carriage comprises a through-opening, the periphery of which, in the vertical projection, can at least in part be situated horizontally within the periphery of a microplate held in the carriage. The lift comprises a second receptacle for microplates, the periphery of which, in the vertical projection, is situated within the periphery of the through-opening, whereby the second receptacle can be moved unhindered through the through-opening in the vertical direction. This design is space-saving and simple. In addition, it allows good accessibility to a microplate held in the lift.

In one embodiment the second receptacle comprises at least one stop, which extends upwardly substantially in the vertical direction from a second plane. The at least one stop can be formed in one piece with the second receptacle. Alternatively, the at least one stop can be arranged on the second receptacle. The at least one stop is designed to limit the lateral movement of a microplate arranged on the second receptacle.

In one embodiment the second receptacle comprises at least two stops, which are distanced from one another and/or are formed in one piece with one another. For example, stops for limiting a first horizontal movement can be formed in one piece with stops for limiting a second horizontal movement. For example, a plurality of stops can be provided on one, more or all sides of the second receptacle. This allows a flexible and optimal arrangement of the stops in respect of the microplates that are to be held.

In one embodiment the stops are arranged and designed in such a way that they can bear against an inner side wall of the microplate held in the second receptacle. It is thus possible to provide a second receptacle having smaller horizontal dimensions.

In one embodiment the receptacle comprises at least one arm, the surface of which is congruent with the second plane, at least in the region of the free end of the arm. For example, two, three, four or more arms extend substantially radial: outwardly from a central fastening of the second receptacle. For example, the arms extend into diagonally opposite corner regions of the second receptacle. With such a design there is no need for large weights to be moved, and smaller actuators can be used for the lift/the lifts. In addition, the horizontal accessibility to the held microplates is increased, in particular since no material of the second receptacle restricts the accessibility in the middle regions of the microplates.

In one embodiment each stop is arranged in the region of the free end of an arm. This design is weight-saving, particularly if the stops for limiting the movement of the microplate in the first and second horizontal direction are combined with one another.

In one embodiment the stops are arranged and designed in such a way that they can bear against an outer side wall of the microplate held in the second receptacle. With this embodiment it is possible to determine from outside whether the microplate held in a lift is bearing correctly against the stops.

In one embodiment the through-opening of the carriage comprises at least one recess, which can be situated laterally outwardly beyond the periphery of a held microplate, and wherein the receptacle of the lift comprises at least one arm, which in the projection in the vertical direction is arranged in the at least one recess. It is thus ensured that the lift can pass unhindered through the recess in the carriage. For example, the carriage comprises rear, front and lateral recesses, and the lift comprises corresponding rear, front and lateral arms.

In one embodiment the through-opening is substantially rectangular. This shape corresponds substantially to the vertical projection of the outlines of the microplates. Accordingly, the second receptacle of the lift is substantially rectangular, which requires a corresponding shape of the through-opening.

In one embodiment the dimensions of the at least one recess equate to a fraction of the dimensions of through-opening. For example, the rear and lateral recesses are narrower and shallower as compared to the width and depth of the through-opening.

In one embodiment one, two or more recesses are provided on each side of the through-opening. In the case of one, two or more recesses distanced from one another, the material of the second receptacle of the lift is only slightly weakened. The number of recesses per side of the carriage correlates with the number of arms of the corresponding lift.

In one embodiment a front recess is provided on a side of the through opening which is a front side in the first horizontal direction, which recess fully penetrates through the front region of the carriage, at least in some sections, wherein the carriage is fork-shaped. As a result of this shape, it is possible to retract the carriage also when the lift is raised.

In one embodiment the carriage comprises a first plane, from which the through-opening extends, and wherein limiters are provided, which extend upwardly in the vertical direction from the first plane so as to be able to restrict the lateral movements of the microplate held in the carriage. It is hereby possible to position and orientate the microplate in a specific position on the lift.

In one embodiment, one, two or more limiters are provided on each side of the carriage. A simple construction can be provided by the plurality of limiters distanced from one another, by means of which simple construction an exact positioning and orientation of a received microplate is possible.

In one embodiment, one, two or more arms is/are provided on each side of the second receptacle. The number of arms of the lift correlates to the number of recesses in the carriage.

In one embodiment, one, two or more stops is/are provided on one, more or all arms. For example, the stops can limit the movement of the inserted microplate to the rear, to the front, or to one of the sides, whereby an exact positioning and orientation of the microplate is possible.

In one embodiment an actuator and a guide are provided, which are operatively connected to the second receptacle of the lift and allow a movement of the second receptacle in the vertical direction. For example, the actuator can be a pneumatic or hydraulic cylinder or a linear drive, a spindle drive, a chain drive, belt drive or gear drive. Conventional rail guides or the like can be used for guidance.

In one embodiment, two or more carriages and a corresponding number of lifts associated therewith are provided, wherein a microplate can be introduced into the processing region of the processing device by way of the at least one first carriage and the at least one first lift associated therewith, and wherein a microplate can be discharged from the processing region of the processing device by way of the at least one second carriage and the at least one second lift associated therewith. By way of such an arrangement it is possible to prevent microplates which are to be brought into the processing region of the processing device from being mixed up with those which are to be discharged from the processing region. The transfer from the first carriage to the second carriage is performed within the processing region of the processing device.

In a further embodiment a carriage and a plurality of lifts associated with openings are provided. A microplate can be introduced through a first opening into the processing region of the processing device by way of the one carriage and a first lift and can be discharged through a second opening from the processing region of the processing device by way of the one carriage and a second lift. In this case, the one carriage is displaceable in the Y direction within the processing region of the processing device. For example, it is thus possible to stack microplates.

The described embodiments of the microplate processing device can be implemented in any combination, provided they are not in conflict.

A microplate processing system according to the invention comprises at least one microplate processing device according to any one of the preceding embodiments and further comprises at least one of the components selected from the group comprising storage unit, washing or dispensing apparatus, and manipulator, wherein each component is arranged above one of the lifts in the vertical direction. The microplate processing device can be combined arbitrarily with conventional components or devices which can be used in conjunction with microplates, which significantly increases the possibilities for use of the microplate processing device. New and/or already used microplates can be stored in a storage unit. For example, the storage can comprise a vertical stacking of the microplates in a housing or in a frame. By way of washing or dispensing apparatuses, liquids can be fed to the microplates or can be suctioned off therefrom. A manipulator for example may comprise grippers, by means of which a microplate placed on a lift can be grasped and moved locally. The movement is possible in all directions and, in addition, the gripper can perform a pivoting or rotational movement in order to position or orientate microplates.

A method according to the invention for introducing microplates into a processing region of a microplate processing device according to any one of the preceding embodiments comprises the steps:

extending the carriage from the processing region of the processing device from an inner position into an outer position;

raising the second receptacle of the at least one lift in the vertical direction from a lower position through the through-opening of the carriage and beyond same into an upper position;

arranging a microplate on the second receptacle;

lowering the second receptacle from the upper position into the lower position;

arranging the microplate on the carriage; and retracting the carriage from the outer position into the inner position.

In one embodiment the arrangement of the microplate is performed by one of the components selected from the group comprising storage unit and manipulator.

A method according to the invention for discharging microplates from a processing region of a microplate processing device according to any one of the preceding embodiments comprises the steps:

extending the carriage from the processing region of the processing device from an inner position into an outer position;

raising the second receptacle of the at least one lift in the vertical direction from a lower position through the through-opening of the carriage and beyond same into an upper position;

arranging a microplate on the second receptacle;

removing the microplate from the second receptacle;

lowering the second receptacle from the upper position into the lower position; and retracting the carriage from the outer position into the inner position.

In one embodiment the removal of the microplate is performed by one of the components selected from the group comprising storage unit and manipulator.

A method according to the invention for discharging and introducing microplates from and into a processing region of a microplate processing device according to any one of the preceding embodiments comprises the steps:

arranging a microplate on the carriage;

extending the carriage from the processing region of the processing device from an inner position into an outer position;

raising the second receptacle of the at least one lift in the vertical direction from a lower position through the through-opening of the carriage and beyond same into a first upper position;

lowering the second receptacle from the first upper position into the lower position;

arranging the microplate on the carriage; and retracting the carriage from the outer position into the inner position.

In one embodiment the above-described method further comprises the steps:

lowering the second receptacle from the first upper position into a second upper position; and raising the second receptacle from the second upper position into the first upper position.

The described embodiments of the method can be implemented in any combination, provided they are not in conflict.

BRIEF DESCRIPTION OF THE FIGURES

Exemplary embodiments of the present invention will be explained hereinafter in greater detail with reference to figures. These are used merely for explanatory purposes and should not be considered to be limiting. In the figures.

DETAILED DESCRIPTION OF THE INVENTION

Figure 1:
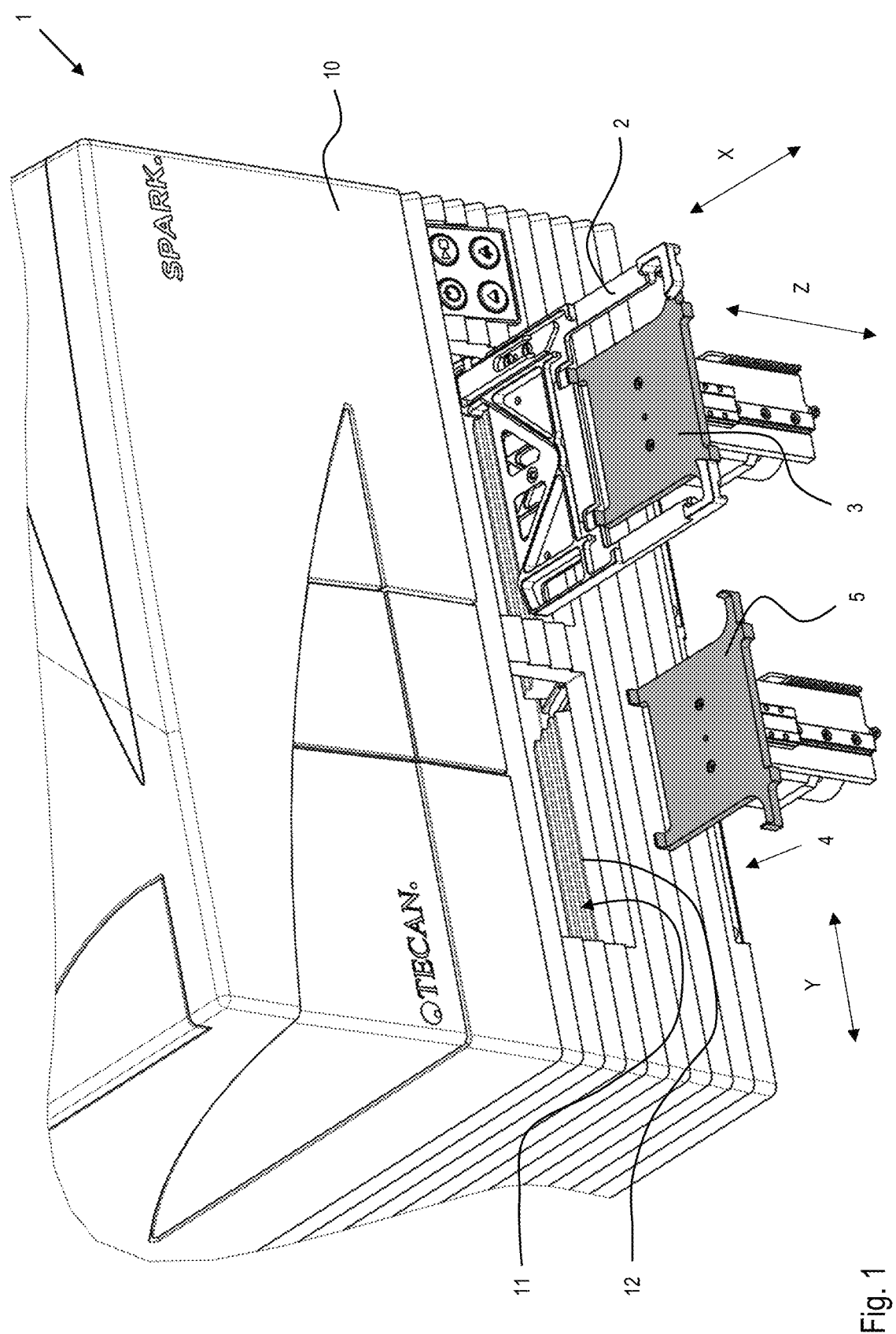
FIG. 1 shows a perspective view of a microplate processing device according to the invention.

FIG. 1 shows a perspective view of a microplate processing device 1 according to the invention. Openings 11 which can be opened from the front face in a first horizontal direction X are provided adjacently in a second horizontal direction Y on a housing 10, wherein the housing 10 substantially fully encloses a processing region. A carriage 2, 4 can be extended horizontally from each opening 11 in the X direction, wherein each of the openings can be closed by a flap 12, which can be pivoted into the interior of the processing device 1. A lift 3, 5 is arranged in front of the housing 10 in the X direction in front of each opening 11 and is movable in the vertical direction Z. Each carriage 2, 4 can be extended from the housing 10 to such an extent that the front edge of each carriage 2, 4 directed towards a user in the X direction comes to lie in a region of the front edge of each lift 3, 5. Each carriage 2, 4 protrudes in the Y direction beyond both sides of the corresponding lift 3, 5.

Figure 2:
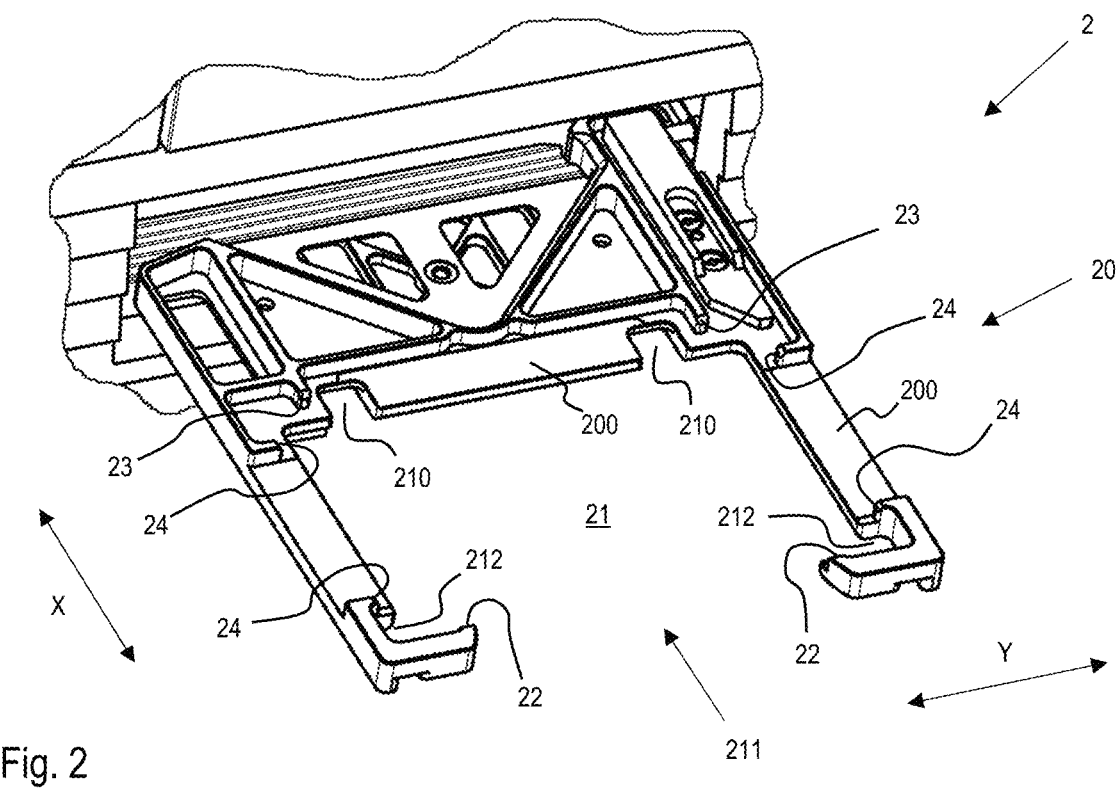
FIG. 2 shows a perspective view of a carriage of the microplate processing device of FIG. 1.

FIG. 2 shows a perspective view of a carriage 2 of the microplate processing device 1 of FIG. 1. The carriage 2 is substantially planar with lateral extents in the X direction and Y direction and with a thickness in the Z direction. The carriage 2 comprises a first receptacle 20 with a first plane 200 which can hold a microplate. A through-opening 21 is provided in the region of the first receptacle 20 and extends fully through the carriage 2 in the Z direction. The through-opening 21 is arranged in a front region of the carriage 2 in relation to the X direction. The lateral regions remaining around the through-opening 21 and the remaining front region in essence form struts which delimit the through-opening 21 to the side and to the front. Two rear recesses 210 are formed jointly with the through-opening 21 and adjoin the through-opening 21. The two rear recesses 210 are distanced from one another and from one of the edges each in the Y direction of the through-opening 21. A front recess 211 is formed jointly with the through-opening 21 and adjoins the through-opening 21. The front recess 211 penetrates fully through the edge of the carriage 2 that is the front edge in the X direction, thus resulting in a fork-shaped design of the carriage 2. A lateral recess 212 is provided on each side of the through-opening 21 in the front region of the through-opening 21 in a manner adjoining the through-opening 21 and is formed jointly with the through-opening 21. The lateral recesses 212 are arranged substantially in the front corner region of the through-opening 21. Limiters 22, 23, 24 extend from the first plane 200 substantially vertically upwardly along the Z direction. Each limiter 22, 23, 24 has a horizontal distance from the through-opening 21 of a few millimetres, for example 1 to 5 millimetres. The front limiters 22 extend upwardly from the remaining part of the front strut over a length of a few millimetres, for example 1 to 5 millimetres. The rear limiters 23 extend upwardly over the same length adjacently and at a distance from the rear recesses 210. The distance is a few millimetres, for example 1 to 5 millimetres. Each of the two rear limiters 23 is arranged laterally outside of and next to the corresponding rear recess 210. The lateral limiters 23, attached to the lateral recesses 212, extend substantially vertically upwardly over the same length. The two lateral limiters 24 which are arranged in the front region of the carriage 2 extend jointly in one piece with the adjacent front limiters 22 from the first plane 200. The two lateral limiters 24 which are arranged in the rear region of the carriage 2 each extend at a distance from the corresponding adjacent rear limiter 23 from the first plane 200.

Figure 3:
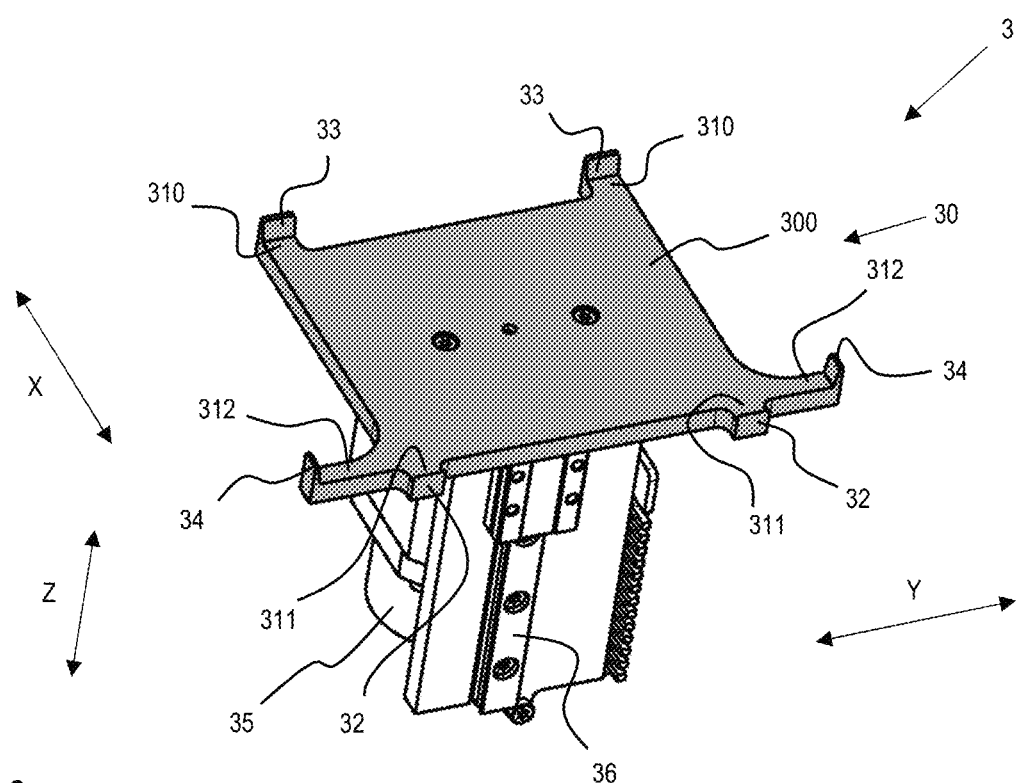
FIG. 3 shows a perspective view of a lift of the microplate processing device of FIG. 1.

FIG. 3 shows a perspective view of a lift 3 of the microplate processing device 1 of FIG. 1. The lift comprises a second receptacle 30, which comprises a second plane, on which microplates can be arranged. The second receptacle 30 comprises substantially a rectangular plate, the upper face of which comprises the second plane 300. Arms 310, 311, 312 extend laterally away from the plate horizontally. Rear arms 310 extend rearwardly in the X direction from the rear edge, connected one to each of the two rear corners. Front arms 311 extend from the front edge towards the front in the X direction, in alignment with the rear arms 310 in relation to the Y direction. Lateral arms 312 extend from the lateral edge laterally outwardly in the Y direction and connected one to each of the two front corners, wherein the front faces of the lateral arms 312 are in alignment with the front face of the plate of the receptacle 30. At the free ends of each arm 310, 311, 312, there extends a stop 32, 33, 34 vertically upwardly in the Z direction from the second plane 300. A front stop 32 is arranged on the front free end of each front arm 311, a rear stop 33 is arranged at the rear free end of each rear arm 310, and a lateral stop 34 is arranged at the lateral free end of each lateral arm 312. The second receptacle 30 of the lift 3 is guided through a guide in the Z direction and is secured against rotation about the Z axis and can be moved in a controlled manner by an actuator 35 in the Z direction. The movement path of the lift 3 is defined by the movement path of the actuator 35 and that of the rail 36.

Figure 4:
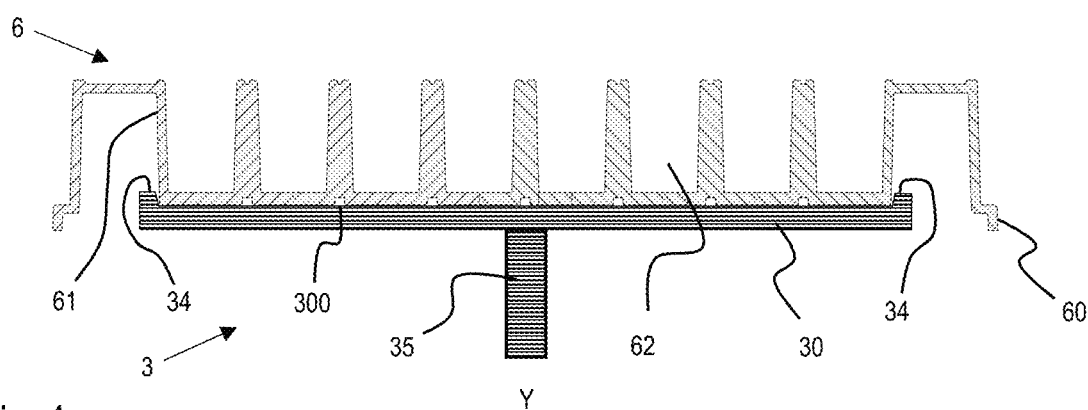
FIG. 4 shows a schematic side sectional view through a lift with a microplate inserted thereon.
Figure 7:
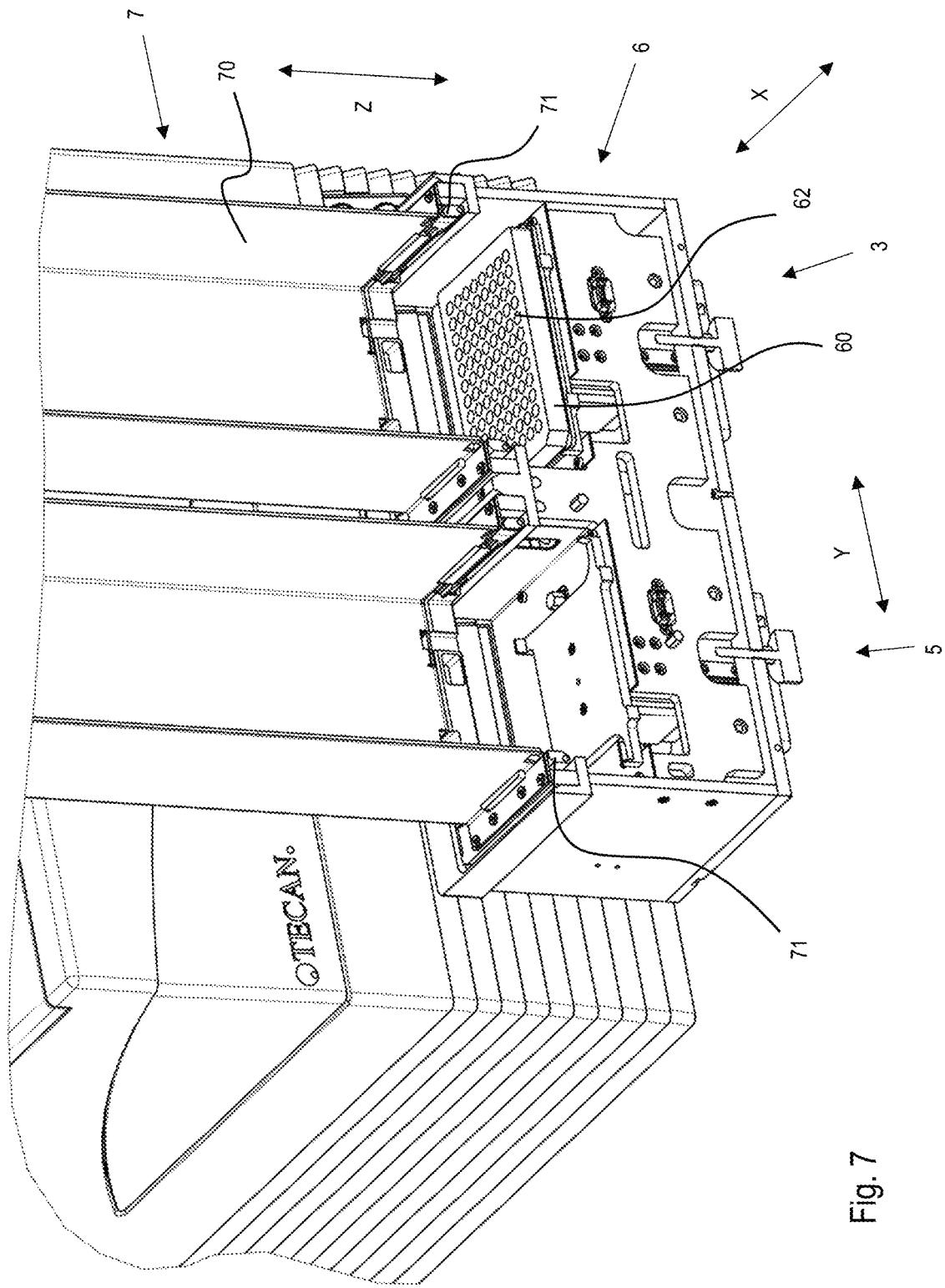
FIG. 7 shows a perspective sectional view of the microplate processing device of FIG. 1 with a storage unit.
Figure 8:
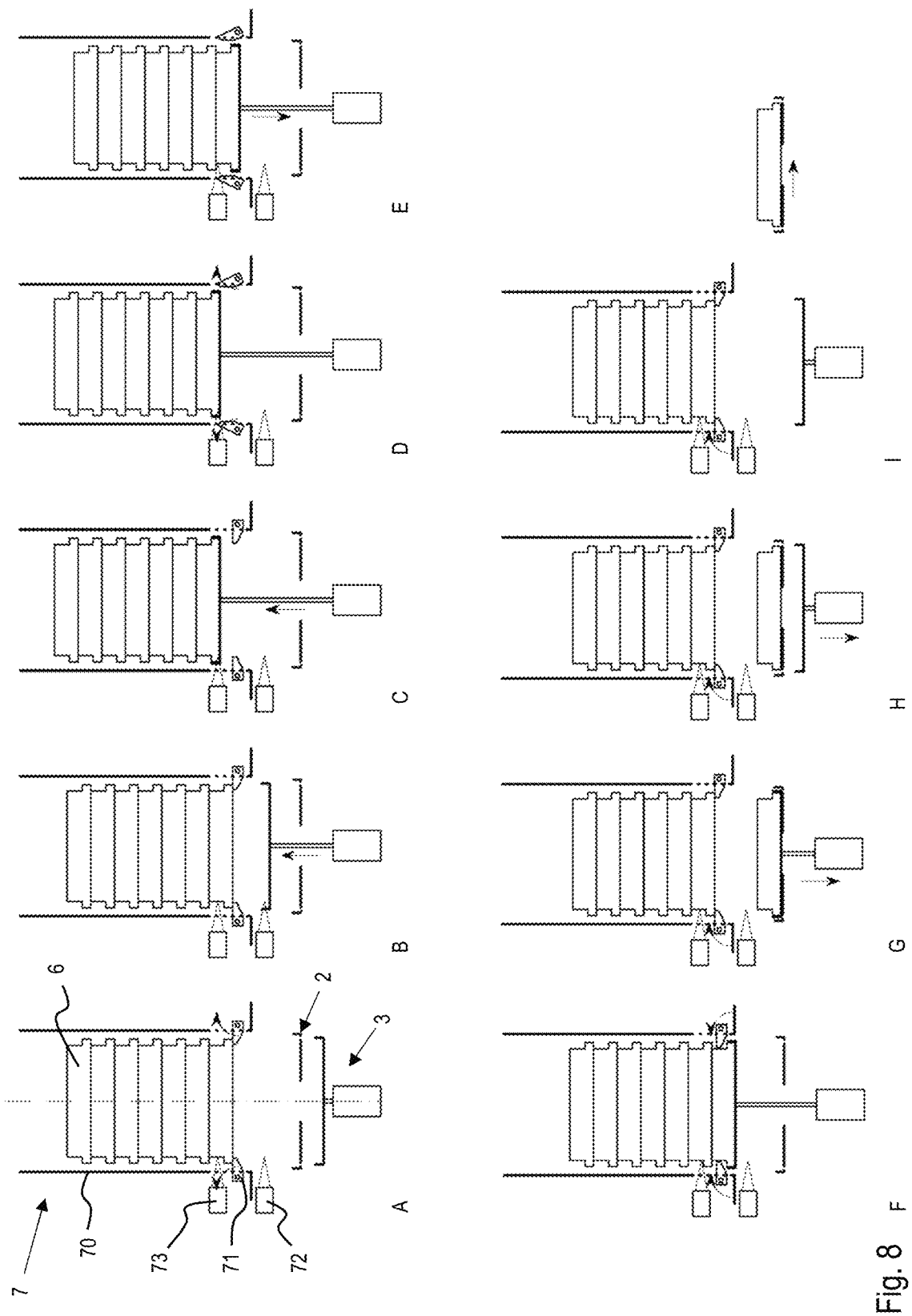
FIGS. 8A-8I show a schematic view of the individual steps for removing or introducing a microplate from or into the storage unit of FIG. 7.

FIG. 4 shows a schematic side sectional view through a lift 3 with a microplate 6 inserted thereon. The microplate 6 lies with the base of the cavities 62 in the second plane 300 of the second receptacle 30. The lateral movement of the microplate 6 in the Y direction is limited by the lateral stops 34. The front and rear stops 32, 33 can be in contact with an inner side wall of the microplate 6. A lateral inner side wall 61 of the microplate 6, which can also be a side wall of the outermost cavities 62, is in contact with the lateral stops 34. Alternatively, the microplate 6 can rest with its outer side walls 60 in the second plane 300 and can be in contact via the outer side walls 60 with the stops 32, 33, 34, as is shown in FIGS. 7 and 8. Alternatively, certain stops of the second receptacle can strike against the outer side wall of the microplate, and other stops of the second receptacle can strike against the inner side wall.

Figure 5:
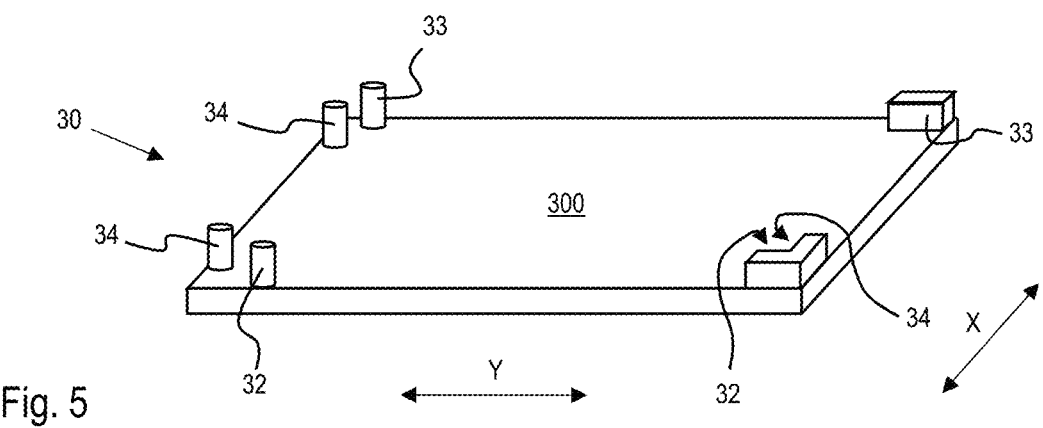
FIG. 5 shows a schematic perspective view of an embodiment of a receptacle of a lift.

FIG. 5 shows a schematic perspective view of an embodiment of a receptacle 30 of a lift 3 with stops distanced from one another or with stops extending jointly in one piece. On the left side of the shown receptacle 30 in relation to the Y direction, all stops extend at a distance from one another from the second plane 300. Cylindrical stops are shown. On the right side of the shown receptacle 30 in relation to the Y direction there extends the front stop 32 at a distance from the rear stop 33. The front stop 32 extends jointly in one piece with the front lateral stop 34. In the shown embodiment there is no rear lateral stop provided. However, it is also possible to provide such a stop. Of course, all possible combinations of stops extending separately from one another and of stops extending jointly in one piece with one another can be realised.

Figure 6:
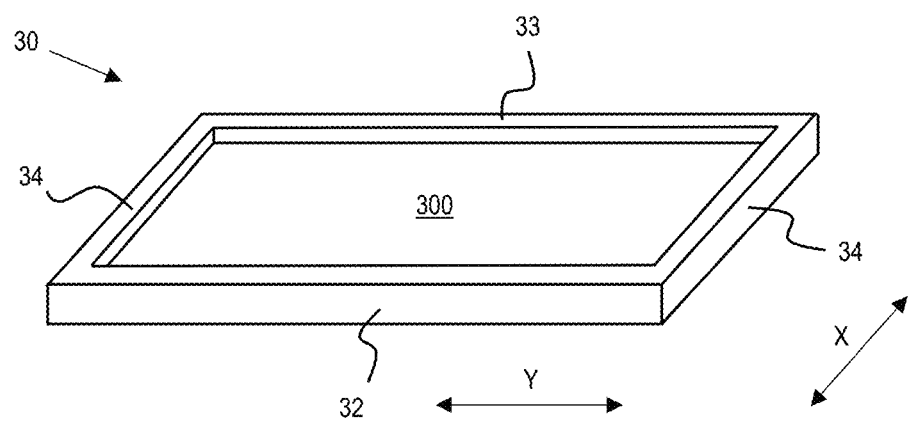
FIG. 6 shows a schematic perspective view of a further embodiment of a receptacle of a lift.

FIG. 6 shows a schematic perspective view of a further embodiment of a receptacle 30 of a lift 3. What is shown is a second receptacle 30, in which all stops 32, 33, 34 extend jointly in one piece with one another from the second plane 300 and together form a closed frame.

FIG. 7 shows a perspective sectional view of the microplate processing device 1 of FIG. 1 with a storage unit 7. Each storage unit 7 is arranged vertically above a lift 3, 5 in the Z direction. The storage unit 7 comprises a housing 70, in which microplates 6 are stackable one above the other in the Z direction. Locking elements 71 prevent the microplates 6 situated in the housing 70 from being able to pass freely through a lower housing opening.

FIGS. 8A-8I show a schematic view of the individual steps for removing or introducing a microplate 6 from or into the storage unit 7 of FIG. 7. The locking elements 71 are arranged laterally on the housing 70 adjacently to the lower housing opening. Sensors 72, 73 are arranged beneath the housing opening and above the locking elements 71 and are able to identify whether a microplate 6 is located in the region in front of the sensors 72, 73. Hereinafter it shall be described how a microplate 6 can be collected from the storage unit. FIG. 8A shows an empty extended carriage 2 and an empty lift 3, which is located in a position beneath the carriage 2. FIG. 8B shows how a first sensor 72 checks whether a microplate is located on the lift 3. If no microplate has been identified, the lift may rise further with the second receptacle into the housing of the storage unit above the locking elements 71 (see FIG. 8C). A second sensor 73 arranged above the locking elements 71 advises whether a microplate 6 is actually situated in the storage unit 7 and terminates the process if this is not the case. The user can be notified of the absence of microplates acoustically and/or optically. If at least one microplate is located in the storage unit, the process is continued. Once a microplate 6 has been received, the locking elements 71 pivot to the side and release the lower housing opening of the storage unit 7 (see FIG. 8D). The lift 3 is then lowered until the held microplate 6 has passed through the region of intervention of the locking elements 71 (see FIG. 8E). The height of the microplate can be determined optionally by means of the first sensor 72. The second sensor 73 optionally can advise that the microplate has passed through the region of intervention. The locking elements 71 are pivoted into the region of intervention, whereby microplates arranged above are held back (see FIG. 8F), the lift 3 is moved further downwards (see FIG. 8G), wherein the microplate 6 held on the lift 3 remains resting on same as the carriage 2 passes through. The carriage 2 with the microplate 6 arranged thereon can then be retracted into the processing region of the microplate processing device (see FIG. 8I). If a microplate 6 is to be introduced into the storage unit 7, the microplate is taken over from the carriage by the lift, the first sensor 72 checks whether there is also actually a microplate located on the lift, and the lift travels in the storage unit via the locking elements until the microplate has passed the locking elements. The fact that the microplate has passed the locking elements can be detected optionally by the second sensor. The lift is then lowered again. The locking elements can be biased so that they can be pushed away upwardly from beneath by a force and automatically move downwardly again in the absence of such a force. The locking elements can be pivoted away upwardly by an actuator.

Figure 9:
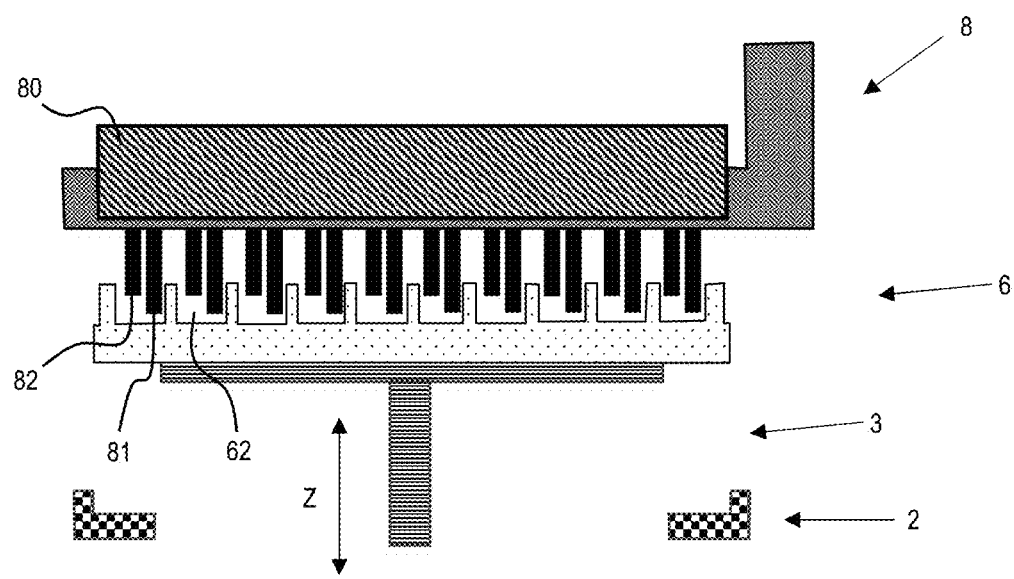
FIG. 9 shows a schematic sectional view through the carriage and the lift of the microplate processing device and through a washing and/or dispensing apparatus.

FIG. 9 shows a schematic sectional view through the carriage 2 and the lift 3 of the microplate processing device and through a washing and/or dispensing apparatus 8. The washing and/or dispensing apparatus 8 comprises a movable head 80, on which tubes are arranged in a row, wherein liquids can be fed to and/or suctioned away from the cavities 62 of the microplate 6 by means of the tubes. The suction tubes 81 are usually longer than the dispensing tubes 82. In order to feed and/or suction liquid to/from the cavities, the tubes are lowered into the cavities. Since microplates 6 comprise a plurality of adjacently arranged rows of cavities, the tubes have to be driven out from the cavities from one row to the next so that they do not collide with microplate. Since in the present invention the vertical movement in the Z direction can be performed by the lift 3, the head of the washing and/or dispensing apparatus 8 only needs to be movable in a horizontal direction, which simplifies the apparatus, which requires less space in the vertical and horizontal directions. The lift 3, in order for liquid to be suctioned away, raises the microplate 6 as far as a first upper position, in which the suction tubes 81 are located just above the base of the cavities 62 dispensing, the lift then lowers the microplate to a second position, in which the suction tube 81 are situated above the edge of the cavities 62. Alternatively, the head may also comprise just one or more tubes. In this case the head must be movable in both horizontal directions X and Y. However, there is a reduced spatial requirement in the vertical Z direction.

Figure 10:
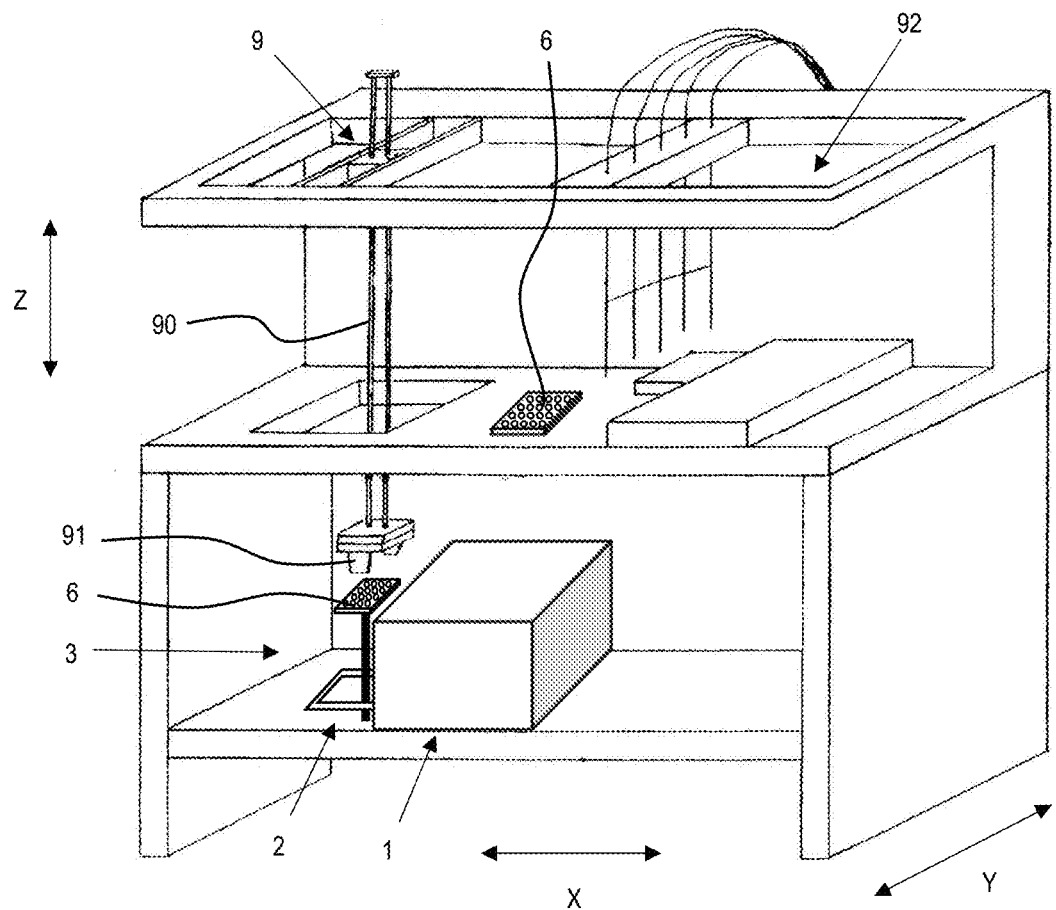
FIG. 10 shows a schematic perspective view of the microplate processing device in a microplate processing system with a manipulator and a pipetting apparatus.

FIG. 10 shows a schematic perspective view of the microplate processing device 1 in a microplate processing system with a manipulator and a pipetting apparatus 92. A manipulator 9 with an arm 90 is provided above the lift 3 in the Z direction, wherein grippers 91 are provided at the lower free end of the arm 90 and can be used to grasp a microplate 6 from the side. The microplate 6 held on the lift 3 is freely accessible from the side in the raised position of the lift 3, which considerably facilitates the grasping by means of the grippers 91 of the manipulator 9. In addition, the required vertical movement path of the manipulator in the Z direction is reduced by the length over which the lift 3 can raise the held microplate, whereby the overall height of the manipulator in the Z direction is reduced. The arm 90 can be movable in both horizontal directions X, Y, whereby the microplate can be placed above and laterally offset in relation to the microplate processing device 1 by way of the manipulator. For example, the microplate can be placed on a work surface for any further apparatus, for example a pipetting apparatus.

LIST OF REFERENCE SIGNS

| | |
|---|---|
| 1 | microplate processing device |
| 10 | housing |
| 11 | opening |
| 12 | flap |
| 2 | first carriage |
| 20 | first receptacle |
| 200 | first plane |
| 21 | through-opening |
| 210 | rear recess |
| 211 | front recess |
| 212 | lateral recess |
| 22 | front limiter |
| 23 | rear limiter |
| 24 | lateral limiter |
| 3 | first lift |
| 30 | second receptacle |
| 300 | second plane |
| 310 | rear arm |
| 311 | front arm |
| 312 | lateral arm |
| 32 | front stop |
| 33 | rear stop |
| 34 | lateral stop |
| 35 | actuator |
| 36 | guide |
| 4 | second carriage |
| 5 | second lift |
| 6 | microplate |
| 60 | outer side wall |
| 61 | inner side wall |
| 62 | cavity |
| 7 | storage unit |
| 70 | housing |
| 71 | locking element |
| 72 | first sensor |
| 73 | second sensor |
| 8 | washing/dispensing apparatus |
| 80 | head |
| 81 | suction tube |
| 82 | dispensing tube |
| 9 | manipulator |
| 90 | arm |
| 91 | gripper |
| 92 | pipetting apparatus |
| X | first horizontal direction |
| Y | second horizontal direction |
| Z | vertical direction |

The invention claimed is:

1. A microplate processing device (1) comprising at least one carriage (2, 4) with a first receptacle (20) for microplates (6), wherein the at least one carriage (2, 4) is linear movable in a first horizontal direction (X), whereby the microplates (6) can be introduced into a processing region of the processing device (1) and can be discharged from the processing region with the at least one carriage (2, 4), at least one lift (3, 5), which is movable in a vertical direction (Z), whereby the microplates (6) can be removed from and supplied to the carriage (2, 4), wherein the carriage (2, 4) comprises a through-opening (21), the periphery of which, in the vertical projection, at least in part is situated horizontally within the periphery of a microplate (6) held in the carriage (2, 4), and wherein the lift (3, 5) comprises a second receptacle (30) for microplates (6), the periphery of which, in the vertical projection, is situated within the periphery of the through-opening (21), whereby the second receptacle (30) can be moved unhindered through the through-opening (21) in the vertical direction (Z), wherein the through-opening (21) of the carriage (2) comprises at least one recess (210, 211, 212), which is situated laterally outwardly beyond the periphery of a held microplate (6), and in that the receptacle (31) of the lift (2, 3) comprises at least one arm (310, 311, 312), which in the projection in the vertical direction (Z) is arranged in the at least one recess (210, 211, 212), and in that a front recess (211) is provided on a side of the through-opening (21) which is a front side in the first horizontal direction (X), which front recess fully penetrates through a section of the front region of the carriage (2, 4), resulting in a fork-shaped carriage (2, 4), wherein the carriage (2, 4) comprises a first plane (200), from which the through-opening (21) extends, and wherein a plurality of limiters (22, 23, 24) are provided, which extend upwardly in the vertical direction (Z) from the first plane (200) so as to be able to restrict the lateral movements of a microplate (6) held in the carriage (2, 4).

2. The microplate processing device (1) according to claim 1, wherein the second receptacle (30) comprises at least one stop (32, 33, 34), which extends upwardly substantially in the vertical direction (Z) from a second plane (300).

3. The microplate processing device (1) according to claim 2, wherein the at least one stops (32, 33, 34) is/are arranged and designed to bear against an inner side wall (61) of a microplate (6) held in the second receptacle (30).

4. The microplate processing device (1) according to claim 2, wherein the at least one stop (32, 33, 34) is/are arranged and designed to bear against an outer side wall (60) of a microplate (6) held in the second receptacle (30).

5. The microplate processing device (1) according to claim 1, wherein the through-opening (21) is rectangular.

6. The microplate processing device (1) according to claim 4, wherein the at least one recess (210, 211, 212) is/are provided on each side of the through-opening (21).

7. The microplate processing device (1) according to claim 1, wherein the at least one arm (311, 312, 313) is/are provided on each side of the second receptacle (30).

8. The microplate processing device (1) according to claim 4, wherein the at least one stops (32, 33, 34) is/are provided on the at least one arms (310, 311, 312).

9. The microplate processing device (1) according to claim 1, wherein an actuator (35) and a guide (36) are provided, which are operatively connected to the second receptacle (30) of the lift (3, 5) and allow a movement of the second receptacle (30) in the vertical direction (Z).

10. The microplate processing device (1) according to claim 1, wherein two or more carriages (2, 4) and two or more lifts (3, 5) associated therewith are provided, wherein microplates (6) can be introduced into the processing region of the processing device (1) by way of at least one first carriage (2) and the at least one associated first lift (3), and wherein microplates (6) can be discharged from the processing region of the processing device (1) by way of at least one second carriage (4) and the at least one associated second lift (5).

11. A microplate processing system comprising at least one microplate processing device (1) according to claim 1 and further comprising at least one of the components selected from the group comprising storage unit (7), washing or dispensing apparatus (8), and manipulator (9), wherein each component is arranged above one of the lifts (3, 5) in the vertical direction (Z).

12. A method for introducing microplates (6) into a processing region of a microplate processing device (1) according to claim 1 comprising the steps:
   extending the carriage (2, 4) from the processing region of the processing device (1) from an inner position into an outer position;
   raising the second receptacle (30) of the at least one lift (3, 5) in the vertical direction (Z) from a lower position through the through-opening (21) of the carriage (2, 4) and beyond same into an upper position;
   arranging a microplate (6) on the second receptacle (30);
   lowering the second receptacle (30) from the upper position into the lower position;
   arranging the microplate (6) on the carriage (2, 4); and
   retracting the carriage (2, 4) from the outer position into the inner position.

13. The method according to claim 12, wherein the arrangement of the microplate (6) is performed by one of the components selected from the group comprising storage unit (7) and manipulator (9).

14. A method for discharging microplates (6) from a processing region of a microplate processing device (1) according to claim 1 comprising the steps:
   extending the carriage (2, 4) equipped with a microplate (6) from the processing region of the processing device (1) from an inner position into an outer position;
   raising the second receptacle (30) of the at least one lift (3, 5) in the vertical direction (Z) from a lower position through the through-opening (21) of the carriage (2, 4) and beyond same into an upper position;
   arranging a microplate (6) on the second receptacle (30);
   retracting the carriage (2, 4) from the outer position into the inner position;
   removing the microplate (6) from the second receptacle (30); and
   lowering the second receptacle (30) from the upper position into the lower position.

* * * * *